US012353039B2

(12) United States Patent
Levy et al.

(10) Patent No.: US 12,353,039 B2
(45) Date of Patent: Jul. 8, 2025

(54) FIBER OPTIC CASSETTE WITH CABLE MANAGER AND SYSTEM

(71) Applicant: BELDEN CANADA ULC, Saint-Laurent (CA)

(72) Inventors: Moise Levy, Laval (CA); Luc Milette, Montreal (CA); Christian Roa-Quispe, Laval (CA); Dwayne Crawford, Pointe-Claire (CA)

(73) Assignee: BELDEN CANADA ULC, Saint-Laurent (CA)

( * ) Notice: Subject to any disclaimer, the term of this patent is extended or adjusted under 35 U.S.C. 154(b) by 201 days.

(21) Appl. No.: 18/051,159

(22) Filed: Oct. 31, 2022

(65) Prior Publication Data

US 2023/0152547 A1 May 18, 2023

Related U.S. Application Data

(60) Provisional application No. 63/263,314, filed on Oct. 29, 2021.

(51) Int. Cl.
*G02B 6/44* (2006.01)
*G02B 6/38* (2006.01)

(52) U.S. Cl.
CPC ......... *G02B 6/4453* (2013.01); *G02B 6/3885* (2013.01); *G02B 6/4471* (2013.01)

(58) Field of Classification Search
None
See application file for complete search history.

(56) References Cited

U.S. PATENT DOCUMENTS

| | | | | |
|---|---|---|---|---|
| 8,452,148 B2* | 5/2013 | Cooke | ................ | G02B 6/4452 |
| | | | | 385/135 |
| 10,429,603 B2* | 10/2019 | Hsu | ...................... | G02B 6/4455 |
| 10,514,518 B1* | 12/2019 | Livingston | ........... | G02B 6/4452 |
| 10,795,107 B2* | 10/2020 | Pilon | ........................ | G02B 6/46 |
| 10,809,479 B2* | 10/2020 | Crawford | ............... | G02B 6/562 |
| 2010/0322580 A1* | 12/2010 | Beamon | ............... | G02B 6/4452 |
| | | | | 385/135 |
| 2016/0062050 A1* | 3/2016 | Giraud | ................. | G02B 6/4471 |
| | | | | 385/56 |
| 2019/0101717 A1* | 4/2019 | Pilon | .................. | G02B 6/44526 |
| 2019/0162924 A1* | 5/2019 | Fontaine | .............. | G02B 6/4452 |
| 2019/0219786 A1* | 7/2019 | Crawford | ............... | G02B 6/562 |

* cited by examiner

*Primary Examiner* — Jerry Rahll
(74) *Attorney, Agent, or Firm* — MH2 Technology Law Group, LLP

(57) ABSTRACT

There is disclosed a fiber optic cassette comprising a cassette body comprising a plurality of optic fiber receptacles arranged along a front thereof and a multifiber receptacle along a back thereof opposite the first end, the front and back defining a cable assembly receiving region there between, and a plurality of optic fibers. Each of the optic fibers terminated at a first end by one of the receptacles and all of the plurality of optic fibers terminated at a second end the multifiber receptacle. In an embodiment a casing is molded over a middle portion of each of the plurality of optic fibers and received within the cable assembly receiving region. In a particular embodiment the cassette is reversible and comprises a reversible securing element which is secureable on either side of the cassette body.

22 Claims, 8 Drawing Sheets

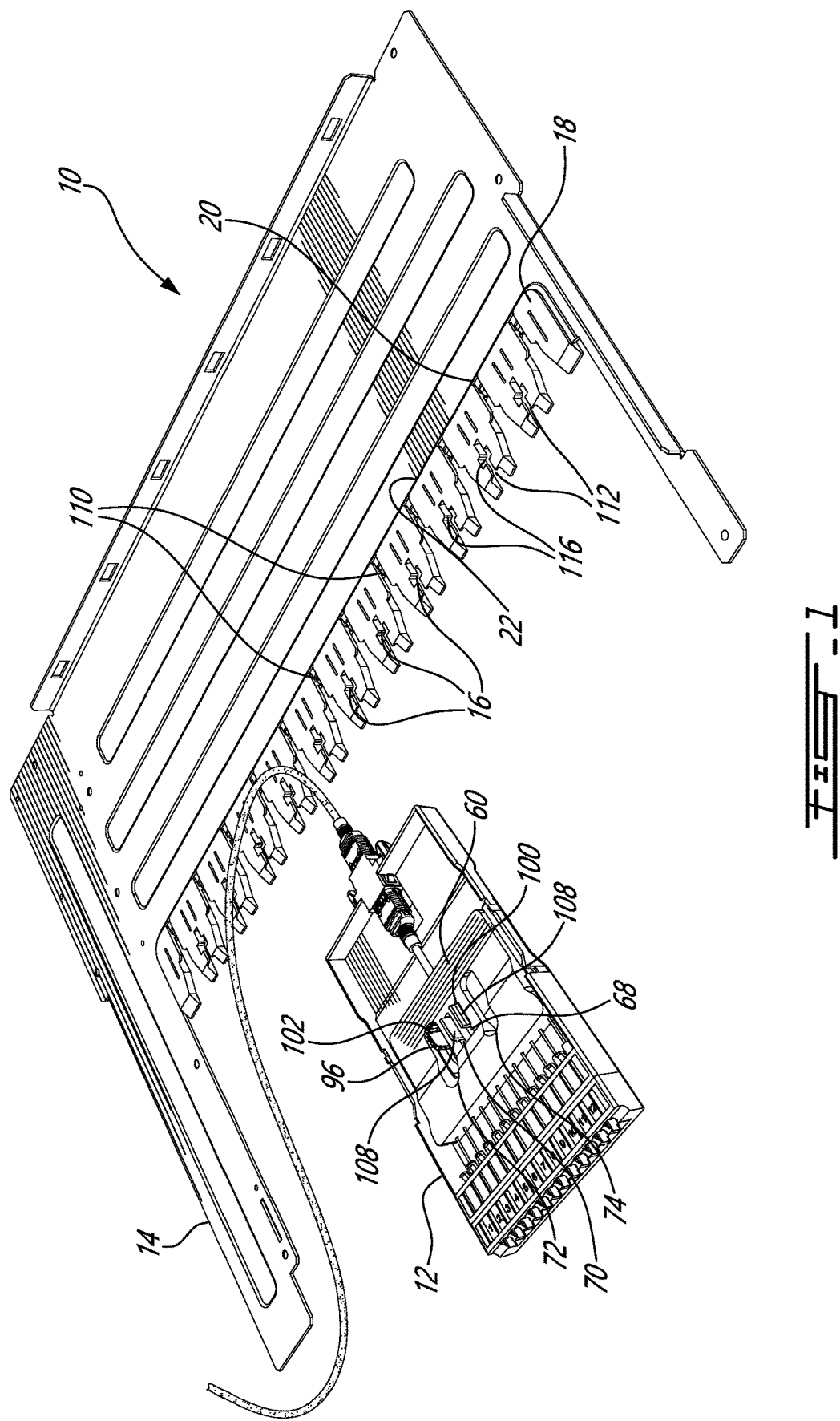

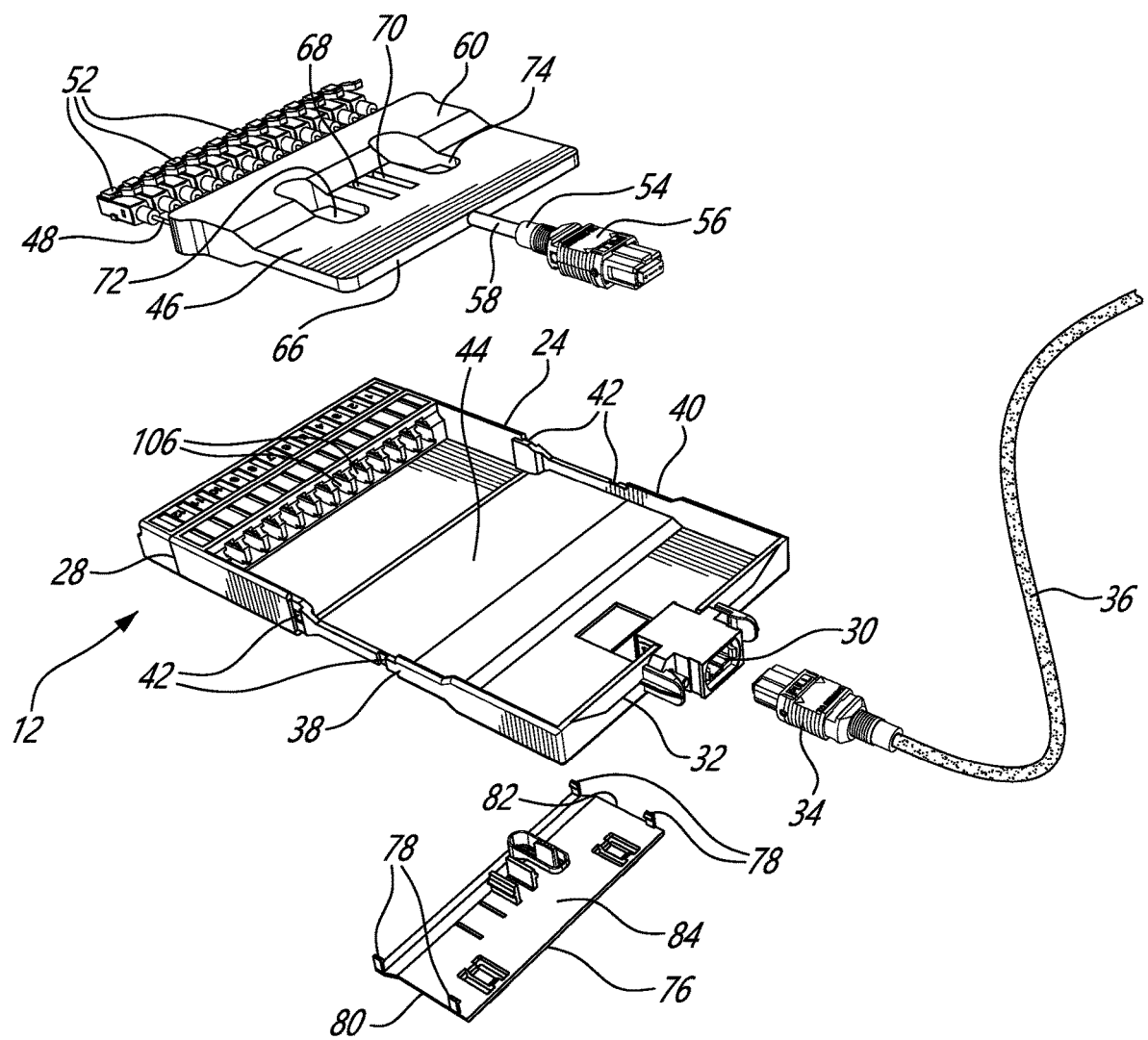

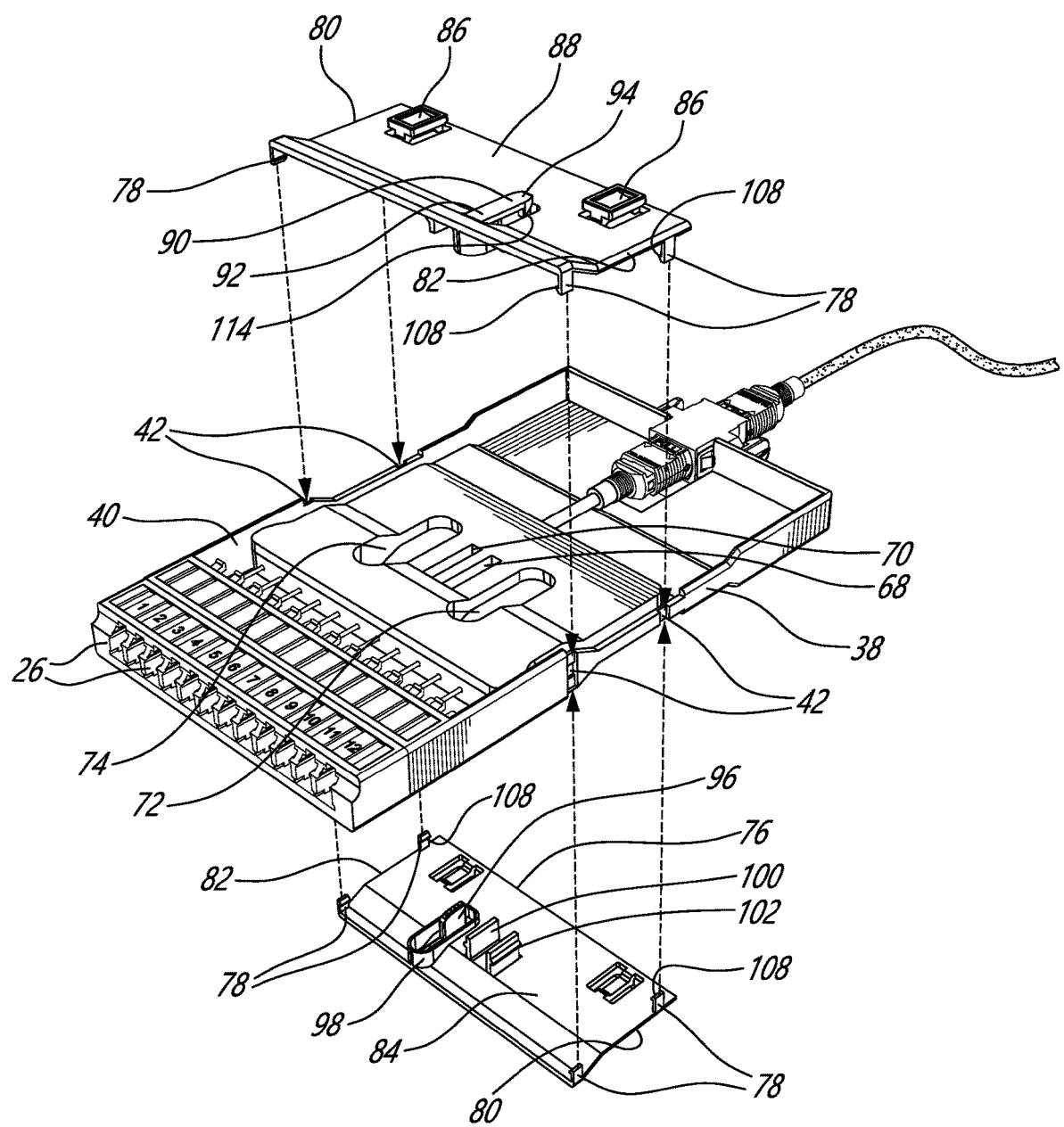

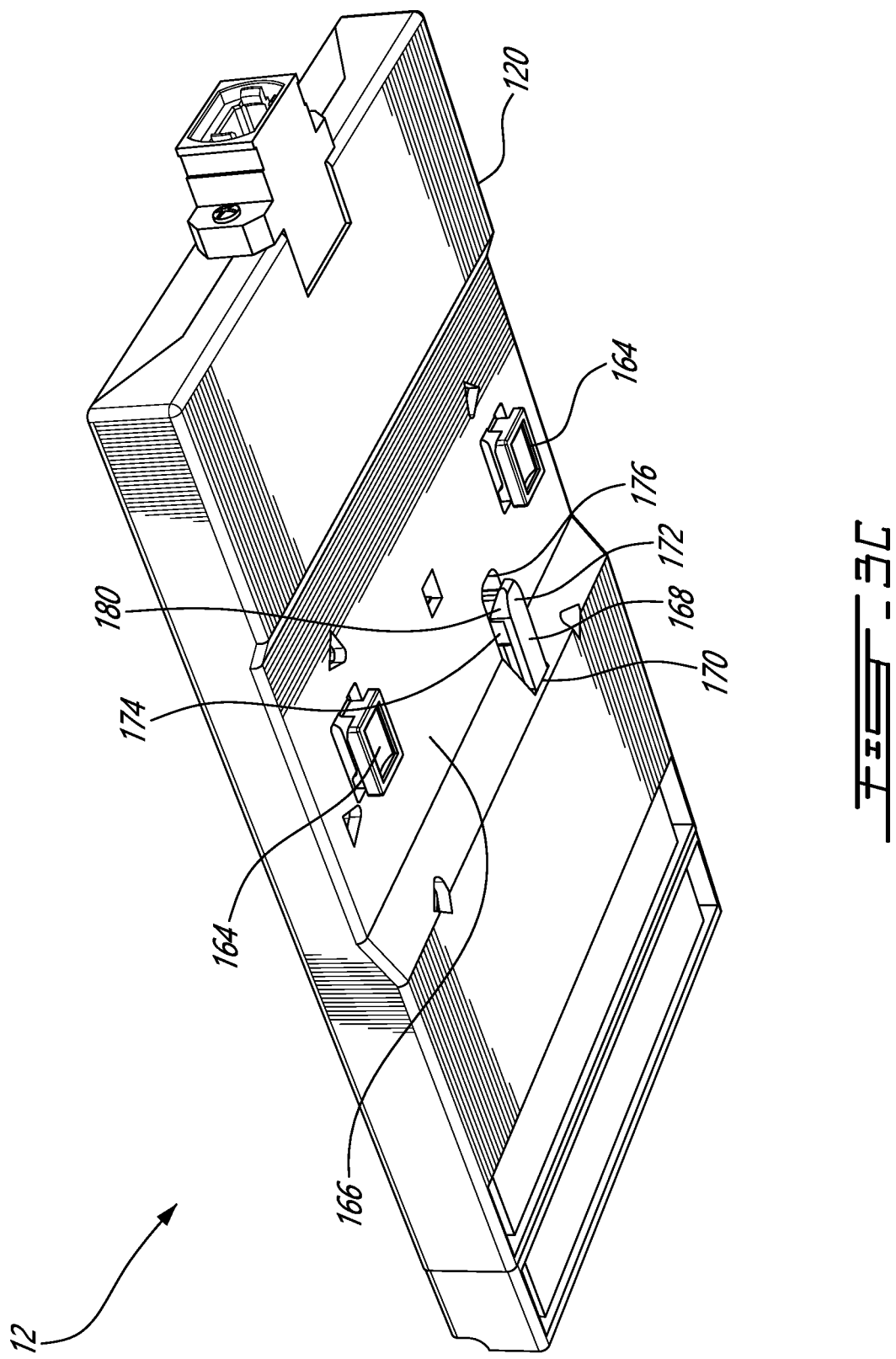

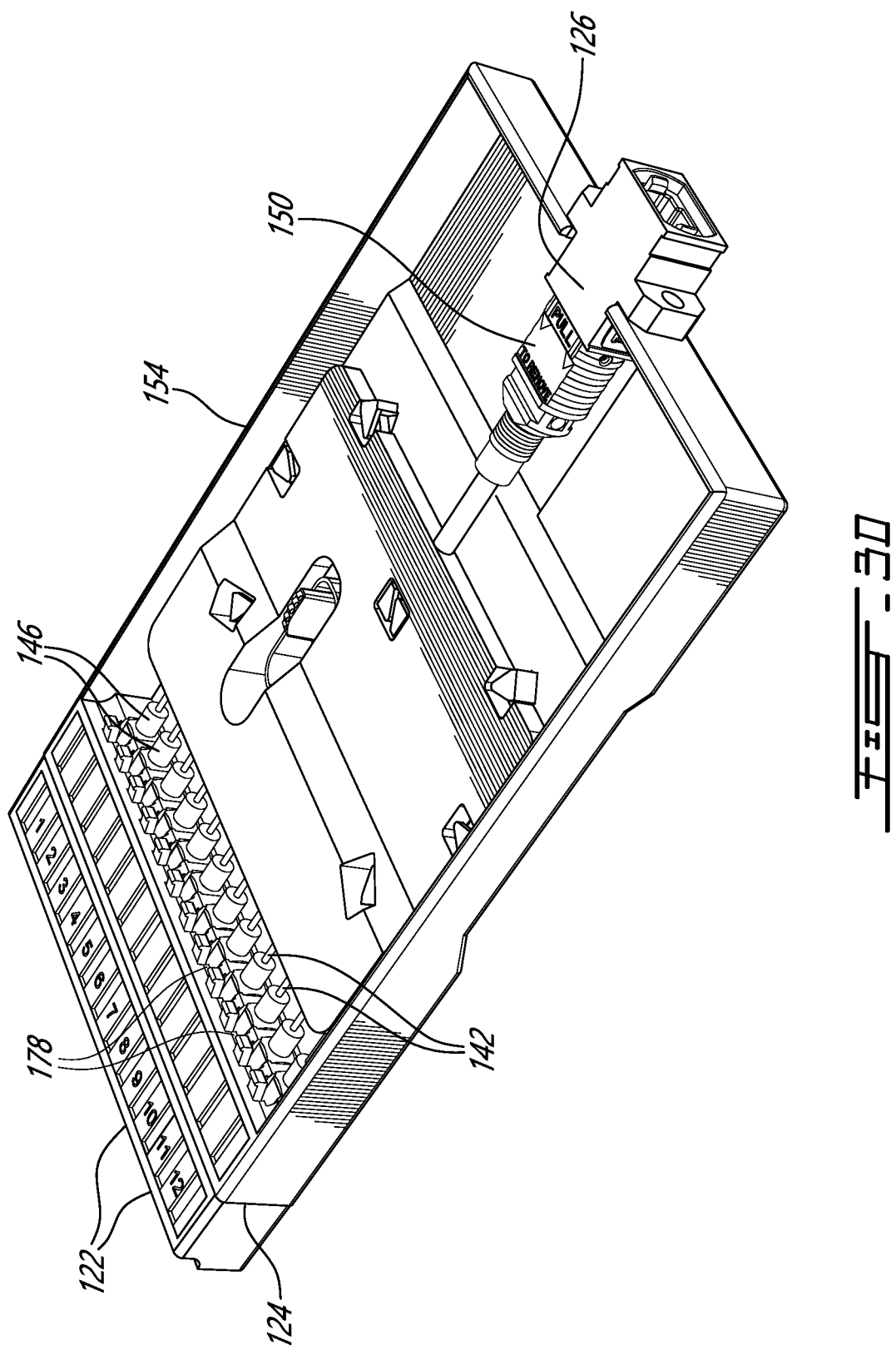

FIBER OPTIC CASSETTE WITH CABLE MANAGER AND SYSTEM

This application claims priority under 35 USC § 119(e) of U.S. provisional application Ser. No. 63/263,314 filed on Oct. 29, 2021 which is incorporated herein in its entirely by reference.

FIELD OF THE INVENTION

The present invention relates to a fiber optic cassette with cable manager and system. In particular, the present invention relates to a reversible fiber optic cassette with overmolded cable manager.

BACKGROUND TO THE INVENTION

The prior art discloses modular cassettes. One drawback of such cassettes is that the optic fibers are placed freely within the cassette body and susceptible to damage and the like.

SUMMARY OF THE INVENTION

The present addresses the above and other drawbacks by providing a fiber optic cassette arrangeable on a tray comprising a plurality of cassette engaging features. The cassette comprises a cassette body comprising a plurality of optic fiber receptacles arranged along a front end, a multifiber receptacle along a back end and a pair of opposed side edges connecting the front end and the back end, a plurality of optic fibers, each of the optic fibers terminated at a first end by a respective one of the receptacles and all of the plurality of optic fibers terminated at a second end by the multifiber receptacle, and a reversible securing member. The front, back and the opposed side edges together define a cable assembly receiving region. The second ends are encased in a cable jacket. A casing is lower pressure molded over a free end of the cable jacket and a middle portion of each of the plurality of optic fibers. The first ends stand free of and are equally spaced along a first casing end and the second ends stand free of a second casing end opposite the first casing end. A pair of parallel slot-like apertures are molded in the casing towards a center thereof. A main part of the reversible securing member is configured to fit sideways across the cassette body towards a center thereof, the main part comprising a first surface and a second surface opposite the first surface. A plurality of pairs of opposed flexible fingers extend away from the first surface and are configured for releasable engagement in respective slots in the side edges of the cassette body, one of each of the pairs of fingers positioned along each outer side edge of the main part. A pair of opposed casing engaging fingers are positioned towards a center of the main part extending at right angles away from the first surface and are configured for insertion into a corresponding one of the pair of parallel slot-like apertures molded in the casing. A tray engaging feature extending from the second surface is positioned off center of the main part and configured for engaging with one of the cassette engaging features. An actuator extends from a flexible end of the tray engaging feature through one of a pair of like apertures in the casing, one of the like apertures on either side of the pair of parallel slot-like apertures, the actuator for selectively disengaging the tray engaging feature from an engaged one of the cassette engaging features. The reversible securing element is secureable on either side of the cassette body by inserting the flexible fingers in respective ones of the outward facing slots while the casing engaging fingers are inserted into respective ones of the slot-like apertures and such that a free end of each of the fingers engages an outer surface of the casing holding the casing against the first surface and the actuator through an aligned one of the pair of like apertures. When the reversible securing member is mounted on a first side of the cassette body, the actuator is actuatable from a second side of the cassette body.

There is also provided a fiber optic cassette arrangeable on a tray comprising a plurality of cassette engaging features. The cassette comprises a cassette body comprising a plurality of optic fiber receptacles arranged along a front thereof and a multifiber receptacle along a back thereof opposite the front and a pair of opposed side edges connecting the front and the back, and a plurality of optic fibers, each of the optic fibers terminated at a first end by one of the receptacles and all of the plurality of optic fibers terminated at a second end the multifiber receptacle. The front, back and the opposed side edges together define a cable assembly receiving region. A tray engaging feature configured for engaging with one of the cassette engaging features extends away from the cable assembly receiving region. A casing is molded over a middle portion of each of the plurality of optic fibers. The first ends stand free of and are equally spaced along a first end of the casing and the second ends stand free of a second end of the casing opposite the first casing end. A casing engagement extends into the cable assembly receiving region for retaining the casing within the cable assembly receiving region.

Also, there is provided a fiber optic cassette comprising a cassette body comprising a plurality of optic fiber receptacles arranged along a front thereof and a multifiber receptacle along a back thereof opposite the front, the front and back defining a cable assembly receiving region there between, and a plurality of optic fibers. Each of the optic fibers terminated at a first end by one of the receptacles and all of the plurality of optic fibers terminated at a second end the multifiber receptacle. A middle portion of each of said plurality of optic fibers is within a casing and received within the cable assembly receiving region.

BRIEF DESCRIPTION OF THE DRAWINGS

FIG. 1 provides raised right perspective view of a reversible fiber optic cassette with cable manager and tray in accordance with an illustrative embodiment of the present invention;

FIG. 2B provides a lowered left rear exploded perspective view of a reversible fiber optic cassette with cable manager in accordance with an illustrative embodiment of the present invention;

FIG. 2C provides a raised right front partially exploded perspective view of a reversible fiber optic cassette with cable manager detailing installation of a reversible securing element and in accordance with an illustrative embodiment of the present invention;

FIG. 3C comprises a lowered left rear perspective view of a fiber optic cassette with cable manager in accordance with an alternative illustrative embodiment of the present invention; and FIG. 3D comprises a raised left rear perspective view of a fiber optic cassette with cable manager in accordance with an alternative illustrative embodiment of the present invention.

DETAILED DESCRIPTION OF THE ILLUSTRATIVE EMBODIMENTS

Figure 2A:
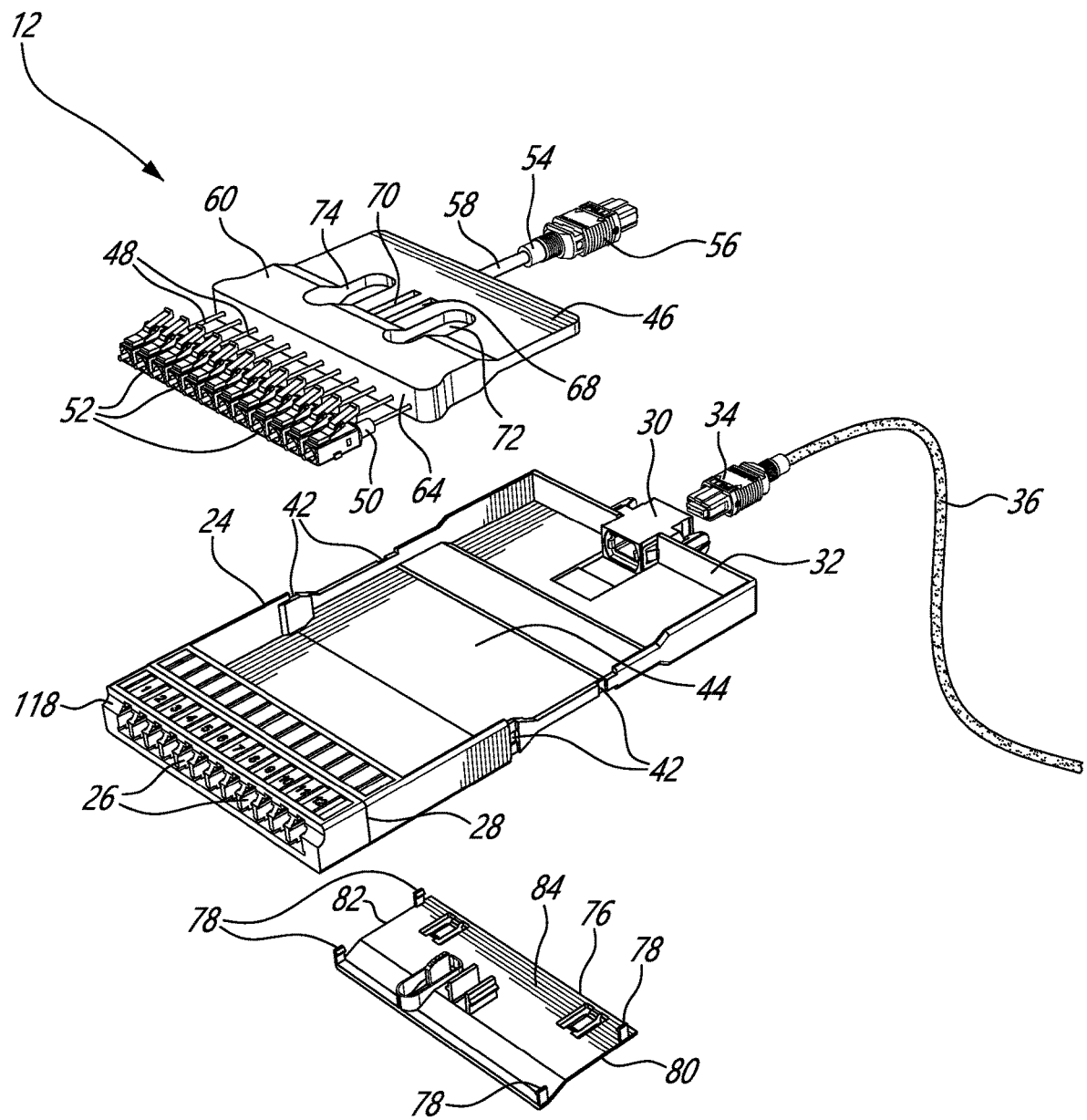
FIG. 2A provides a raised right front exploded perspective view of a reversible fiber optic cassette with cable manager in accordance with an illustrative embodiment of the present invention.

Referring now to FIG. 1, a fiber optic cassette with cable manager, generally referred to using the reference numeral 10, will now be described. The cassette and system 10 comprises one or more cassettes 12 which are releasably mounted to a tray 14 comprising a plurality of cassette engaging features 16. The tray 14 is typically slideably mounted with other trays in a case which is dimensioned for securing in a 19" inch rack or the like (both not shown). The cassette engaging features 16 are illustratively molded as a strip 18 from a rigid material such as plastic and mounted on a forward edge 20 of the tray 14. The strip 18 is assembled to the forward edge 20 of the tray 14 by inserting the forward edge 20 in the rearward edge 22 of the strip 18 until the strip 18 is engaged by the tabs or the like (not shown) thereby securing the strip 18 to the tray 14.

Referring to FIGS. 2A and 2B, each cassette 12 comprises a cassette body 24 comprising a plurality of optic fiber receptacles 26 arranged along a front 28 of the cassette body 24 and a multifiber receptacle 30 arranged along a back 32 of the cassette body 24 opposite the front end. In an embodiment the optic fiber receptacles 26 are configured for receiving a standard LC type plug for example terminating a single fiber optic cable or the like (both not shown). Additionally, in an embodiment the spacing between the optic fiber receptacles 26 is such that any two optic fiber receptacles 26 can receive two plugs (also not shown) in a duplex configuration. In an embodiment the multifiber receptacle 30 is a back-to-back receptacle configured for receiving on an outside a standard MPO type plug 34 terminating a 12X multi-fiber cable 36 or the like.

Still referring to FIGS. 2A and 2B, the cassette body 24 further comprises a pair of opposed outer side edges 38, 40 interconnecting the front 28 and the back 32 of the cassette body 24. Referring to FIG. 2C, each of the side edges 38, 40 comprises a pair of outward facing slots 42 therein. Together, the front 28, back 32 and side edges 38, 40 define a cable assembly receiving region 44 there between.

Still referring to FIGS. 2A and 2B, the cassette 12 further comprises an over-molded cable assembly 46 which is dimensioned to fit within the cable assembly receiving region 44. The cable assembly 46 comprises a plurality of optic fibers 48 each terminated at a first end 50 by a plug 52. In an embodiment the plug 52 is an LC type plug and dimensioned to fit into a standard LC type receptacle. The optic fibers 48 are each additionally terminated at a second end 54 by a multifiber plug 56 such as a standard MPO type plug which is dimensioned to fit into a standard MPO type receptacle. The second ends 54 are illustratively encased in a cable jacket 58. A casing 60 is molded over an open end of the cable jacket 58 and middle portions (not shown) of each of the optic fibers 48. In this regard, the middle portions of the optic fibers 48 are placed in a mold (not shown) comprising the desired outer shape of the casing 60 and the mold filled with a suitable plastic, for example using Low Pressure Molding (LPM) techniques or an epoxy, plastine, mastic or the like. The over-molding is such that the first ends 50 and their respective plugs 52 stand free of and are equally spaced along a first end 64 of the molded casing 60 and the second ends 54 stand free of a second end 66 of the casing 60 opposite the first housing end 64. Additionally, a pair of parallel slot-like apertures 68, 70 are molded in the casing 60 towards a center thereof and a pair of like oval apertures 72, 74 are molded in the casing 60, one of the like apertures 72, 74 on either side of the pair of parallel slot-like apertures 68, 70.

Referring to FIG. 2C in addition to FIGS. 2A an 2B, in an embodiment a removable and reversible securing element 76 is also provided which comprises a main part dimensioned to fit sideways across the cassette body 24. The securing element 76 comprises pairs of opposed flexible fingers 78 positioned along respective outer edges 80, 82 of the securing element 76 and extending away from a first surface 84 thereof. Additionally, there are provided a pair of stabilizing tabs 86 extending away from a second surface 88 of the securing element 76. The reversible securing element 76 further comprises a tray engaging feature 90 comprising a fixed end 92 and a flexible end 94 extending from the second surface 88 of the reversible securing element 76. An actuator 96 is further provided which extends from the flexible end 94 through an aperture 98 in the reversible securing element 76. Additionally, a pair of opposed housing engaging fingers 100, 102 are provided positioned towards a center of the reversible securing element 76 and extending at right angles away from the first surface 86.

Referring back to FIG. 1 in addition to FIG. 2C, in one embodiment the cassette 12 is assembled by attaching the securing element 76 to a selected side of the cassette body (as will be discussed in more detail below). The cable assembly 46 is then attached to the securing element 76 by inserting the housing engaging fingers 100, 102 into respective ones of the pair of parallel slot-like apertures 68, 70 in the casing 60. Hook features 104 on the outer ends of each of the housing engaging fingers 100, 102 engage an outer surface of the housing, thereby securing the casing 60 against the first surface 84 of the securing element 76. Additionally, the actuator 96 is inserted through an aligned one of the oval like apertures 72, 74. As a person of ordinary skill in the art will now understand, once assembled the actuatable surface of the actuator 96 is accessible from the accessible side of the cassette 12 when the cassette 12 is installed on the tray 14.

Referring to FIG. 2B in addition to FIG. 2C, as the casing 60 is assembled to the securing element 76, the plugs 52 are inserted into respective ones of a plurality of receptacles 106 illustratively molded inside the front 28 of the cassette body 24. Each of the receptacles 106 is in a back-to-back relationship with a respective one of the receptacles 26 arranged along the front 28 of the cassette body 24 and such that the optic fiber 48 terminated by one of the plugs 52 and inserted into a receptacle 106 is aligned for optical communication with an optic fiber terminated by a plug (both not shown) inserted into a respective one of the receptacles 26 arranged along the front 28 of the cassette body 24. Additionally, the multifiber plug 56 is inserted into the multifiber receptacle 30 on an inside thereof.

Still referring to FIG. 2C, the reversible securing element 76 is mountable to a selected side of the cassette body 24 and such that the cassette 12 is in a configured orientation (both mounting options are shown in FIG. 2C, although a person of ordinary skill in the art will understand that only one option is useable at a time) by aligning the flexible fingers 78 with respective ones of the outward facing slots 42 and inserting the flexible fingers 78 into the outward facing slots 42. Hook features 108 on the outer ends of the flexible fingers 78 engage with the opposed outer side edges 38, 40 thereby removably securing the reversible securing element 76 to the cassette body 24.

Referring again to FIG. 1 in addition to FIG. 2C, on insertion of the cassette 12 onto the tray 14 in its configured orientation, the stabilising tabs 86 are engaged by respective ones of a plurality of slots 110 in the strip 18 while the actuator 96 is slid into a slot 112 in the selected cassette engaging feature 16 and a hook 114 on the flexible end 94 of the tray engaging feature 90 moves into an aperture 116 in the cassette engaging feature 16. A person of ordinary skill in the art will now understand that the hook 114 is biased into the aperture 116 by the flexible end 94 and such that the cassette 12 is securely held to the tray 14. Similarly, in order to release the cassette 12 from the tray 14, the actuator 96 is depressed thereby forcing the hook 114 out of the aperture 116 in the cassette engaging feature 16 thereby allowing the cassette 12 to be retracted from the tray 14.

Referring back to FIGS. 2A and 2B, in an embodiment the receptacles 26 are molded together as a block 118, illustratively a block 118 of twelve (12) LC type receptacles. Similarly, an inside of the front 28 comprises a plurality of receptacles 106 molded or otherwise formed therein. In an embodiment, the receptacles 106 are configured for receiving a standard LC type plug (not shown) for example terminating a single fiber optic cable or the like. The block 118 of receptacles 26 is attached to the front 28 for example by sonic welding, a suitable adhesive or the like.

Figure 3A:
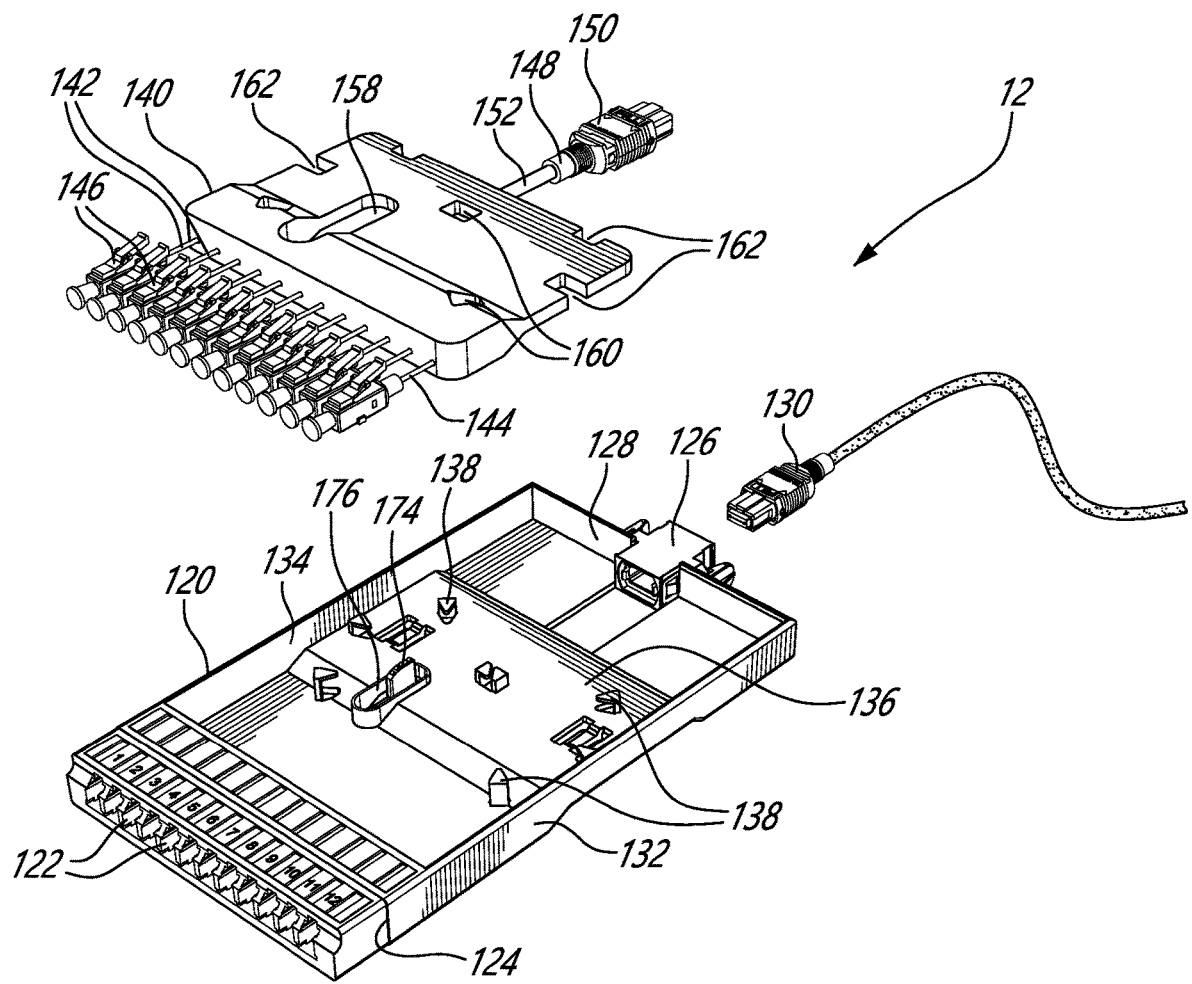
FIG. 3A comprises a raised right front exploded perspective view of a fiber optic cassette with cable manager in accordance with an alternative illustrative embodiment of the present invention.
Figure 3B:
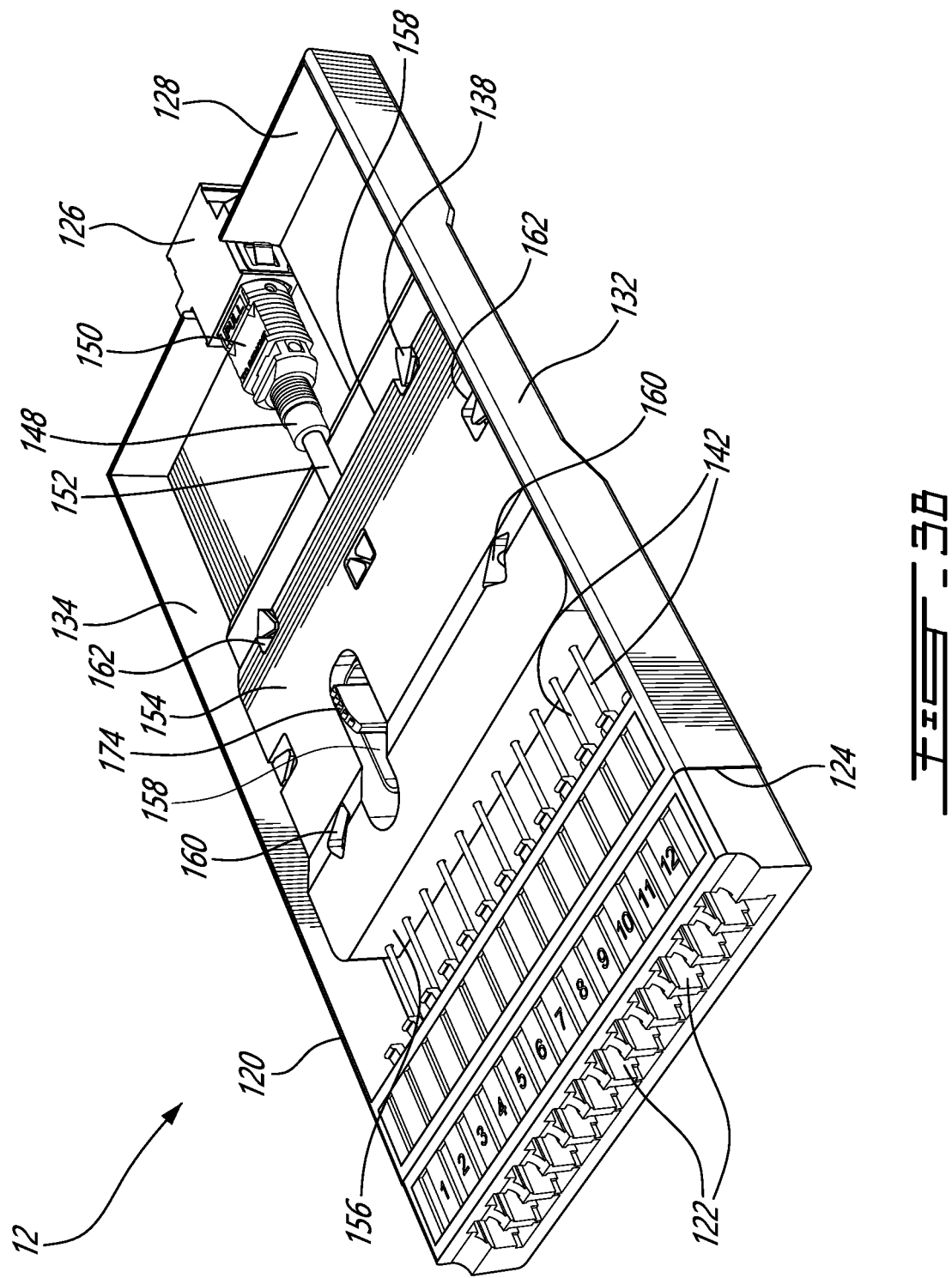
FIG. 3B comprises a raised right front perspective view of a fiber optic cassette with cable manager in accordance with an alternative illustrative embodiment of the present invention.

Referring now to FIGS. 3A and 3B, in an alternative embodiment, the cassette 12 is not reversible. Each cassette 12 comprises a cassette body 120 comprising a plurality of optic fiber receptacles 122 arranged along a front 124 of the cassette body 120 and a multifiber receptacle 126 arranged along a back 128. In an embodiment the optic fiber receptacles 122 are configured for receiving a standard LC type plug for example terminating a single fiber optic cable or the like (both not shown). Additionally, in an embodiment the spacing between the optic fiber receptacles 122 is such that any two optic fiber receptacles 122 can receive two plugs (also not shown) in a duplex configuration. In an embodiment the multifiber receptacle 126 is a back-to-back receptacle configured for receiving on an outside a standard MPO type plug 130.

Still referring to FIGS. 3A and 3B, the cassette body 120 further comprises a pair of opposed side edges 132, 134 interconnecting the front 124, back 128 and bottom of the cassette body 120. Together, the front 124, back 128, side edges 132, 134 and bottom define a cable assembly receiving region 136. In one embodiment, tabs 138 are provided within the cable assembly receiving region 136 on a first surface of the bottom for receiving loose fibre optic cables (not shown).

Still referring to FIGS. 3A and 3B, the cassette 12 further comprises an over-molded cable assembly 140 which is dimensioned to fit within the cable assembly receiving region 136. The over-molded cable assembly 140 comprises a plurality of optic fibers 142 each terminated at a first end 144 by a plug 146. In an embodiment the plug 146 is an LC type plug and dimensioned to fit into a standard LC type receptacle. The optic fibers 142 are each additionally terminated at a second end 148 by a multifiber plug 150 such as a standard MPO type plug which is dimensioned to fit into a standard MPO type receptacle. The second ends 148 are illustratively encased in a cable jacket 152. A housing 154 is molded over an open end of the cable jacket 152 and middle portions (not shown) of each of the optic fibers 142, as discussed above, for example, using Low Pressure Molding (LPM) techniques. The over-molding is such that the first ends 144 and their respective plugs 146 stand free of and are equally spaced along a first end 156 of the molded housing 154 and the second ends 148 stand free of a second end 158 of the housing 154 opposite the first housing end 156. Additionally, an oval actuator receiving aperture 158 is molded in the housing 154 as well as a plurality of tab receiving apertures 160 and tab receiving cut-outs 162.

Referring to FIG. 3C in addition to FIGS. 3A and 3B, in the alternative embodiment a pair of stabilizing tabs 164 are provided extending away from a second surface 166 of the bottom of the a cassette body 120. A tray engaging feature 168 comprising a fixed end 170 and a flexible end 172 extending from the second surface 166 of the bottom of the a cassette body 120 is also provided. An actuator 174 is further provided which extends from the flexible end 172 through an aperture 176 in the bottom of the a cassette body 120.

Still referring to FIGS. 3A, 3B and 3C, in the alternative embodiment the cassette 12 is assembled by placing the over-molded cable assembly 140 in the cable assembly receiving region 136 while the actuator 174 is aligned with and inserted into the oval apertures 158 in the housing 154. As a person of ordinary skill in the art will now understand, once assembled the actuatable surface of the actuator 174 is accessible from the accessible side of the cassette 12 when the cassette 12 is installed on the tray.

Referring to FIG. 3D in addition to FIG. 3C, as the housing 154 is assembled to into the cable assembly receiving region 136, the plugs 146 are inserted into respective ones of a plurality of receptacles 178 illustratively molded inside the front 124 of the cassette body 120. Each of the receptacles 178 is in a back-to-back relationship with a respective one of the receptacles 122 arranged along the front 124 of the cassette body 120 and such that the optic fiber 142 terminated by one of the plugs 146 and inserted into a receptacle 178 is aligned for optical communication with an optic fiber terminated by a plug (both not shown) inserted into a respective one of the receptacles 122 arranged along the front 124 of the cassette body 120. Additionally, the multifiber plug 150 is inserted into the multifiber receptacle 126 on an inside thereof.

Referring again to FIG. 1 in addition to FIG. 3C, on insertion of the cassette 12 onto the tray 14 in its configured orientation, the stabilising tabs 164 are engaged by respective ones of a plurality of slots 110 in the strip 18 while the actuator 174 is slid into a slot 112 in the selected cassette engaging feature 16 and a hook 180 on the flexible end 170 of the tray engaging feature 168 moves into an aperture 116 in the cassette engaging feature 16. A person of ordinary skill in the art will now understand that the hook 180 is biased into the aperture 116 by the flexible end 170 and such that the cassette 12 is securely held to the tray 14. Similarly, in order to release the cassette 12 from the tray 14, the actuator 174 is depressed thereby forcing the hook 180 out of the aperture 116 in the cassette engaging feature 16 thereby allowing the cassette 12 to be retracted from the tray 14.

Although the present invention has been described hereinabove by way of specific embodiments thereof, it can be modified, without departing from the spirit and nature of the subject invention as defined in the appended claims.

The invention claimed is:

1. A fiber optic cassette arrangeable on a tray comprising a plurality of cassette engaging features, the cassette comprising:
   a cassette body comprising a plurality of optic fiber receptacles arranged along a front end, a multifiber receptacle along a back end and a pair of opposed side edges connecting said front end and said back end;
   a plurality of optic fibers, each of said optic fibers terminated at a first end by a respective one of said receptacles and all of said plurality of optic fibers terminated at a second end by said multifiber receptacle;
   a reversible securing member;
   wherein said front end, back end and said opposed side edges together define a cable assembly receiving region;
   wherein said second ends are encased in a cable jacket,
   wherein a casing is lower pressure molded over a free end of said cable jacket and a middle portion of each of said plurality of optic fibers;
   wherein said first ends stand free of and are equally spaced along a first casing end of said casing and said second ends stand free of a second casing end opposite said first casing end;
   wherein a pair of parallel slot-like apertures are molded in said casing towards a center thereof;
   wherein a main part of said reversible securing member is configured to fit sideways across said cassette body towards a center thereof, said main part comprising a first surface and a second surface opposite said first surface;
   wherein a plurality of pairs of opposed flexible fingers extend away from said first surface and are configured for releasable engagement in respective slots in said side edges of said cassette body, one of each of said pairs of fingers positioned along each outer side edge of said main part;
   wherein a pair of opposed casing engaging fingers are positioned towards a center of said main part extending at right angles away from said first surface and are configured for insertion into a corresponding one of said pair of parallel slot-like apertures molded in said casing;
   wherein a tray engaging feature extending from said second surface is positioned off center of said main part and configured for engaging with one of the cassette engaging features;
   wherein an actuator extends from a flexible end of said tray engaging feature through one of a pair of like apertures in said casing, one of said like apertures on either side of said pair of parallel slot-like apertures, said actuator for selectively disengaging said tray engaging feature from an engaged one of the cassette engaging features; and
   wherein said reversible securing element is secureable on either side of said cassette body by inserting said flexible fingers in respective ones of said outward facing slots while said casing engaging fingers are inserted into respective ones of said slot-like apertures and such that a free end of each of said fingers engages an outer surface of said casing holding said casing against said first surface and said actuator through an aligned one of said pair of like apertures and further wherein when said reversible securing member is mounted on a first side of said cassette body, said actuator is actuatable from a second side of said cassette body.

2. The fiber optic cassette of claim 1, wherein each of said optic fibers comprises a first plug at said first end and each of said receptacles comprises a back-to-back receptacle, each of said first plugs configured for insertion into said respective one of said back-to-back receptacles.

3. The fiber optic cassette of claim 1, wherein all of said optic fibers comprise a second plug at said second end, said second plug configured for insertion into said multifiber receptacle.

4. A fiber optic cassette arrangeable on a tray comprising a plurality of cassette engaging features, the cassette comprising:
   a cassette body comprising a plurality of optic fiber receptacles arranged along a front thereof and a multifiber receptacle along a back thereof opposite said front and a pair of opposed side edges connecting said front and said back;
   a plurality of optic fibers, each of said optic fibers terminated at a first end by one of said receptacles and all of said plurality of optic fibers terminated at a second end by said multifiber receptacle;
   wherein said front, back and said opposed side edges together define a cable assembly receiving region;
   wherein a tray engaging feature configured for engaging with one of the cassette engaging features extends away from said cable assembly receiving region;
   wherein a casing is molded over a middle portion of each of said plurality of optic fibers;
   wherein said first ends stand free of and are equally spaced along a first end of said casing and said second ends stand free of a second end of said casing opposite said first casing end; and
   wherein a casing engagement extends into said cable assembly receiving region for retaining said casing within said cable assembly receiving region.

5. The fiber optic cassette of claim 4, further comprising an actuator for disengaging said tray engaging feature from an engaged one of the cassette engaging features.

6. The fiber optic cassette of claim 4, wherein said casing comprises a pair of slot-like apertures molded therein, wherein said casing engagement comprises a pair of fingers each configured for insertion into a respective one of said slot-like apertures and wherein upon insertion of each of said fingers into said respective one of said slot-like apertures, each of said fingers engages said respective one of said slot-like aperture thereby retaining said casing within said cable assembly receiving region.

7. The fiber optic cassette of claim 4, further comprising a reversible securing member:
   wherein a main part of said reversible securing member is configured to fit sideways across said cassette body towards a center thereof, said main part comprising a first surface facing said cable assembly receiving region and a second surface opposite said first surface;
   wherein said reversible securing member is secureable on either side of said cassette body;
   wherein said casing engagement extends from said first surface; and wherein said tray engaging feature extends from said second surface.

8. The fiber optic cassette of claim 7, wherein a pair of opposed flexible fingers are positioned along each outer side edge of said main part extending away from said first surface, wherein said opposed flexible fingers are configured for releasable engagement in respective slots in said side edges of said cassette body and wherein said reversible securing member is secureable on either side of said cassette body by inserting said flexible fingers in respective ones of said outward facing slots.

9. The fiber optic cassette of claim 7, wherein said casing comprises a pair of slot-like apertures molded therein, wherein a pair of opposed casing engaging fingers are positioned towards a center of said main part extending at right angles away from said first surface, wherein each of said casing engaging fingers are configured for insertion into a respective one of said slot-like apertures and wherein upon insertion of each of said fingers into said respective one of said slot-like apertures, each of said fingers engages said respective one of said slot like aperture thereby retaining said casing within said cable assembly receiving region.

10. The fiber optic cassette of claim 7, wherein said tray engaging feature extends away from said second surface.

11. The fiber optic cassette of claim 10, wherein said tray engaging is positioned off center of said main part, wherein an actuator extends from a flexible end of said tray engaging feature through one of a pair of like apertures in said casing, one of said like apertures on either side of said pair of parallel slot-like apertures, said actuator for selectively disengaging said tray engaging feature from an engaged one of the cassette engaging features.

12. The fiber optic cassette of claim 10, wherein said second ends are encased in a cable jacket and wherein said casing is molded over a free end of said cable jacket.

13. A fiber optic cassette comprising:
a cassette body comprising a plurality of optic fiber receptacles arranged along a front thereof and a multifiber receptacle along a back thereof opposite said front, said front and back defining a cable assembly receiving region there between; and
a plurality of optic fibers;
each of said optic fibers terminated at a first end by one of said receptacles and all of said plurality of optic fibers terminated at a second end said multifiber receptacle;
wherein a middle portion of each of said plurality of optic fibers is within a casing and received within said cable assembly receiving; and
wherein the casing is molded over the middle portions of the plurality of optic fibers.

14. The fiber optic cassette of claim 13, wherein the cassette is arrangeable on a tray comprising a plurality of cassette engaging features and wherein a tray engaging feature configured for engaging with one of the cassette engaging features extends away from said cable assembly receiving region.

15. The fiber optic cassette of claim 13, wherein said first ends stand free of and are equally spaced along a first casing end.

16. The fiber optic cassette of claim 15, wherein said second ends are encased in a cable jacket and wherein said casing is molded over a free end of said cable jacket.

17. The fiber optic cassette of claim 13, wherein said second ends stand free of a second casing end opposite said first casing end.

18. The fiber optic cassette of claim 13, wherein each of said optic fibers comprises a first plug at said first end, each of said first plugs configured for insertion into said respective one of said receptacles.

19. The fiber optic cassette of claim 13, wherein all of said optic fibers comprise a second plug at said second end, said second plug configured for insertion into said multifiber receptacle.

20. The fiber optic cassette of claim 19, further comprising an actuator for disengaging said tray engaging feature from an engaged one of the cassette engaging features.

21. The fiber optic cassette of claim 20, wherein said casing comprises a pair of slot-like apertures molded therein, wherein said casing engagement comprises a pair of fingers each configured for insertion into a respective one of said slot-like apertures and wherein upon insertion of each of said fingers into said respective one of said slot-like apertures, each of said fingers engages said respective one of said slot-like aperture thereby retaining said casing within said cable assembly receiving region.

22. The fiber optic cassette of claim 13, further comprising a casing engagement for retaining said casing within said cable assembly receiving region.

* * * * *